(12) United States Patent
Klassen (10) Patent No.: US 6,507,669 B1
(45) Date of Patent: Jan. 14, 2003

(54) METHOD OF SELECTING CLUSTERS OF ITEMS USING A FUZZY HISTOGRAM ANALYSIS

(75) Inventor: R. Victor Klassen, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/359,557

(22) Filed: Jul. 22, 1999

Related U.S. Application Data (63) Continuation-in-part of application No. 09/217,209, filed on Dec. 21, 1998, now Pat. No. 6,385,337.

(51) Int. Cl.⁷ .................................................. G06K 9/00
(52) U.S. Cl. ........................................ 382/170; 382/171
(58) Field of Search ................................ 382/160, 224, 382/231, 168, 173

(56) References Cited

U.S. PATENT DOCUMENTS

| | | | |
|---|---|---|---|
| 4,858,141 A | | 8/1989 | Hart et al. .................. 364/483 |
| 4,937,747 A | | 6/1990 | Koller ........................ 364/422 |
| 4,991,092 A | * | 2/1991 | Greensite .................... 382/131 |
| 5,040,133 A | * | 8/1991 | Feintuch et al. ............. 382/225 |
| 5,179,643 A | | 1/1993 | Homma et al. .............. 395/140 |
| 5,389,936 A | | 2/1995 | Alcock ........................ 342/465 |
| 5,621,861 A | | 4/1997 | Hayashi et al. ................ 395/23 |
| 5,644,232 A | | 7/1997 | Smith .......................... 324/309 |
| 5,764,824 A | * | 6/1998 | Kurtzburg et al. ............. 706/50 |
| 5,828,793 A | * | 10/1998 | Mann .......................... 382/294 |
| 6,304,675 B1 | * | 10/2001 | Osbourn et al. ............. 382/225 |

FOREIGN PATENT DOCUMENTS

| WO | WO 98/28710 | * | 7/1998 | ............. G06T/5/00 |

\* cited by examiner

Primary Examiner—Jingge Wu
(74) Attorney, Agent, or Firm—Aditya Krishnan; Christopher D. Wait (57) ABSTRACT

A method and apparatus for selecting clusters of a set of data items by using a histogram. This method includes receiving item data including coordinates of a metric space; dividing the metric space into a plurality of bins; associating a distance from at least a particular coordinate to each of the item data; inserting each of the item data into a bin within the distance of the item data so as to generate a histogram and, using the histogram to obtain one or more clusters.

10 Claims, 7 Drawing Sheets

METHOD OF SELECTING CLUSTERS OF ITEMS USING A FUZZY HISTOGRAM ANALYSIS

This application is a continuation-in-part of application Ser. No. 09/217,209, filed Dec. 21, 1998 now U.S. Pat. No. 6,385,337.

FIELD OF THE INVENTION

The invention relates generally to image processing and more specifically to selecting clusters of items associated with particular bins using a fuzzy histogram technique.

BACKGROUND OF THE INVENTION

A number of clustering algorithms are described in the book "Clustering Algorithms" by H. A. Hartigan. The majority of prior art clustering algorithms follow one of the two following approaches:

In the first approach, a single cluster is formed of all of the data, and then the cluster currently under consideration is split in some way into two or more clusters, with each resulting cluster being recursively considered and possibly split, if it does not satisfy some criterion. The key source of variation in the many algorithms that follow the recursive-split approach is the way of splitting.

In the second approach, each item in the full data set is initially in a single cluster, and then nearby clusters are merged with each other until there are no clusters which continue to improve the clustering if they are merged. In some applications there is an advantage to having the ordering in which clusters were merged, as this gives a hierarchical clustering of the data. A refinement which combines the two dominant approaches is to alternate between splitting and merging.

The method of the present invention is faster than either splitting or merging based techniques, since it takes time proportional to the number of items to be clustered, plus time proportional to the number of clusters found, while prior methods require time proportional to the number of data items plus time proportional to a function greater than linear in the number of clusters found.

In many applications it may be used on its own; in applications where the properties of a particular prior art algorithm are desired, the present method may be used as a pre-process, followed by a reduced amount of refinement by the prior art algorithm.

Various techniques for cluster analysis have hereinbefore been devised as illustrated by the following disclosures, which may be relevant to certain aspects of the present invention.

U.S. Pat. No. 4,858,141 to Hart et al. issued Aug. 15, 1989, discloses a cost analysis technique employed to group changes in measurements into certain categories in logic application to identify individual appliances. In particular, the purpose of cost analysis is to determine which changes in the measurements are commonly observed. Frequent occurring changes can be as a result of setting an appliance on and off. Therefore, the number of clusters found indicates the number of appliances and the number of changes in a cluster indicating the frequency of the appliance used. The pairing of on and off transitions enables an algorithm to determine the energy consumption of the individual appliances. Therefore, the characteristic changes in the measurement associated with each cluster can be used to identify the nature of the individual appliance.

U.S. Pat. No. 5,621,861 to Hayashi et al. issued Apr. 15, 1999, discloses a method of learning data required to execute a neural network learning procedure. Such learning procedure, includes the steps of supplying an original set of learning sampling data to an input layer of a neural network and measuring a first value of a recognition index that is obtained by the neural network, dividing the original set of learning data into a plurality of different subgroups and judging respective values of a recognition index obtained from each of the subgroups. Hence, selecting from the subgroups for use in the learning procedure, one subgroup meeting a criteria of providing a value of a recognition index that is at least equal to the first value of the recognition index. The original and high set of learning samples are divided using a cluster analysis of the original entire learning sample data into a plurality of subgroups, the subgroups being respectively applied to a neural network as learning data and with respect of values of recognition index obtained thereby for the neural network being judged.

U.S. Pat. No. 5,179,643 to Homma et al., issued Jan. 2, 1993 discloses a method and system for extracting a characteristic from information handled by a computer and displaying the information in a manner to clarify the characteristic. A cluster analysis is used to analyze a relationship among information items.

U.S. Pat. No. 5,389,936 to Alcock, issued Jan. 14, 1995 discloses a method of analyzing clusters of bearings A, B, C, D taken of distant sources by an array of direction finding stations. A combination of bearing is taken one from each of the stations. Each bearing of the combination is taken in turn as a spoke directed at a source. The triangulation process generates a bar of intersection points along the spoke for each bearing of the combination. The number of overlaps between pairs of bars along a spoke is totaled to give a spoke score. The spoke scores of all spokes are the combination is summed to form a fixed confidence score for a source which may be associated with a cluster.

U.S. Pat. No. 5,644,232 to Smith, issued Jul. 1, 1997 discloses a method and apparatus for a medical applications. A cluster analysis can be used to, for example, to show the comparison of a viable tumor in a lung injury is to a viable tumor in a hepatic metastasis. A cluster analysis can be formed in the following way to give a numerical estimate of similarity.

U.S. Pat. No. 5,644,232 to Smith, issued Jul. 1, 1997 discloses a cluster analysis technique that can assist or replace objective judgement of trained operators when using an MRI apparatus. In particular, Smith discloses cluster analysis used in conjunction with calculations or judgements regarding a similarity with respect to stored libraries of signatures.

U.S. Pat. No. 4,937,747 to Koller, issued Jun. 26, 1990 discloses a method of cluster analysis wherein an analysis for determining subpopulations in a dataset is determined. In particular, a data set comprising depth related log responses is selected by classifying the dataset into disjoint clusters and performing various measurement agreements/disagreements.

All of the above cited references are incorporated by reference for their teachings.

OBJECTS AND SUMMARY OF THE INVENTION

In order to achieve the foregoing and other objects, and to overcome the shortcomings discussed above, a method for choosing clusters in a data set is presented. Included in this method is the receiving of item data including coordinates of a metric space, the dividing of the metric space into a plurality of bins, and the associating of a distance from at least a particular coordinate to each of the item data. The method further involves the inserting of each of the item data into a bin within the distance of the item data so as to generate a histogram and using the histogram to obtain one or more clusters.

An approach is presented to determine all the bins within a given radius of each item of a set of items. Next, in this approach, there is performed a procedure of entering an item of the set of items into each bin within the given radius, and incrementing a count associated with each bin as an item is being entered. After the count is incremented, a histogram is developed to store the counts associated with each bin.

Another approach includes the steps of receiving item data including coordinates of a metric space, dividing the metric space into a plurality of bins, and associating a distance to each of the item data. The approach further includes inserting each of the item data into a bin within the distance of the item data and from this step both generating a histogram and using the histogram to determine a cluster.

The methods described above can be carried out in a microcomputer programmed which would, for example, receive item coordinate information of a particular space, and would associate distance information from various coordinate(s) to each of the item data.

Other objects, features, and advantages according to the present invention will become apparent on the following detailed description of illustrative embodiments when read in connection with the accompanying drawings in which corresponding components are identified by the same reference numerals.

While the present invention is described primarily in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DESCRIPTION OF THE PREFERRED EMBODIMENT

Figure 1:
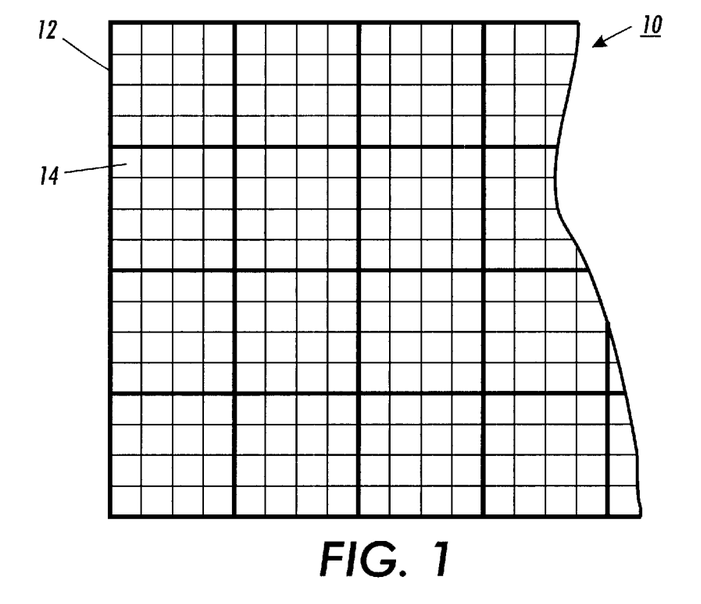
FIG. 1 is a generalized flowchart that shows the steps followed to select pixel colors according to the present invention.
Figure 2:
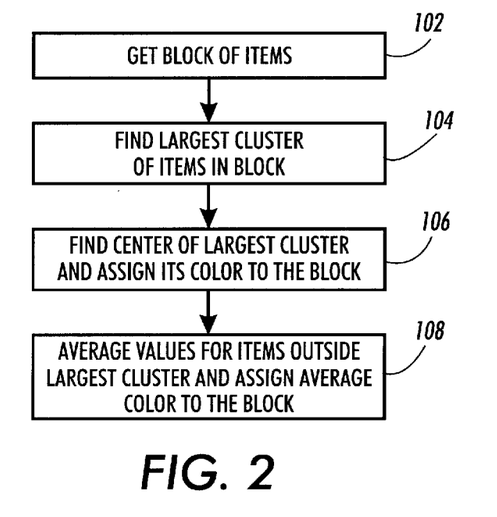
FIG. 2 is a generalized flowchart that shows the steps followed to select pixel colors according to the present invention

Referring now to FIG. 1, a general description of the present invention will now be described. Data is often grouped in "clusters." A cluster of data is defined herein as a group of items that have associated with them locations in some metric space that are substantially identical values. As shown, a set of data is acquired and the clusters in the set that include the largest number of items is identified as indicated in step 104. Once the largest cluster is identified, the item 14 at or nearest to the center of the cluster is located as shown in step 104 and the digital value of this item is selected as the representative for the cluster. While this embodiment of the invention is described as selecting the value of the geometric center of the cluster, those skilled in the art will appreciate that a mathematical center such as for example a mean or median signal value might be chosen instead. In fact, if it is advantageous to do so, a minimum or maximum signal value for pixels in the cluster could also be chosen. Signal values for all pixels in the cluster are then set equal to the value of the chosen value. Next, items associated with the cluster are deleted from the set, and the next largest cluster is found.

Figure 3:
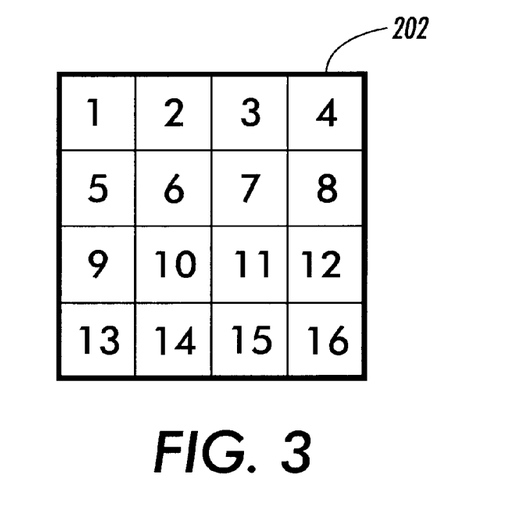
FIG. 3 shows one embodiment of the portion of the invention that includes finding the largest cluster of pixels in the present invention.
Figure 4:
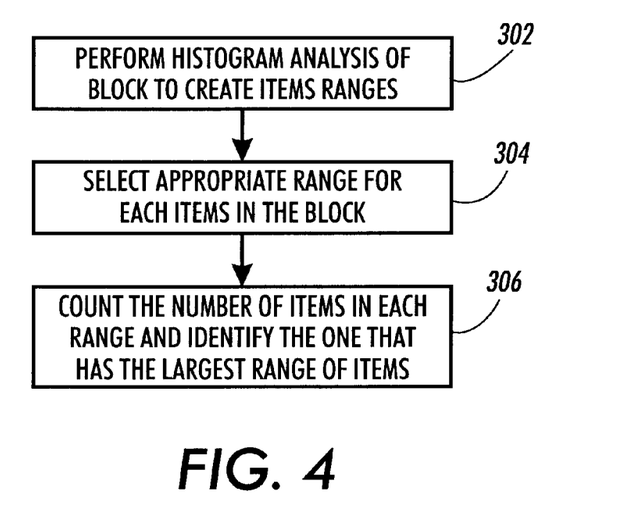
FIG. 4 is a detailed flow diagram depicting another embodiment of the portion of the invention that includes finding the largest cluster of pixels in the present invention.

Turning now to FIG. 4, the details of one embodiment of finding the largest cluster includes performing a histogram analysis on the items in block 12 to locate clusters of item location ranges as shown in step 302. Referring for a moment to FIG. 3, assume that a 16 element set with items numbered as shown has locations that have the following values (in a one dimensional space); 166, 158, 164, 14, 162, 167, 12, 8, 170, 204, 248, 251, 202, 209, 246, 242. Items 1, 2, 3, 5, 6 and 9 (with locations 166, 158, 164, 162, 167 an 170) lie within the same range, items 4, 7 and 8 with locations 14, 12 and 8 are within another range, items 10, 13 and 14 with locations 204, 202 and 209 are in yet another range and items 11, 12, 15 and 16 with locations 248, 251, 246 and 242 are within yet a fourth range. The histogram analysis may show that four location ranges—signal values between 0–89, 90–180, 181–230 and 231–255—are acceptable under these circumstances. For the sake of examples, item locations are shown as simple scalar values (i.e. numbers). In reality, locations are normally multidimensional vector quantities. For this reason the histogram is multidimensional.

Turning back to FIG. 4, once the histogram analysis has been completed, each item will be assigned to the cluster that is associated with the signal location range in which it falls as indicated in step 304, and the number of pixels in each range will be counted as indicated in step 306. In the example provided here, cluster #2 with locations between 90–180 is obviously the largest cluster.

Figure 5:
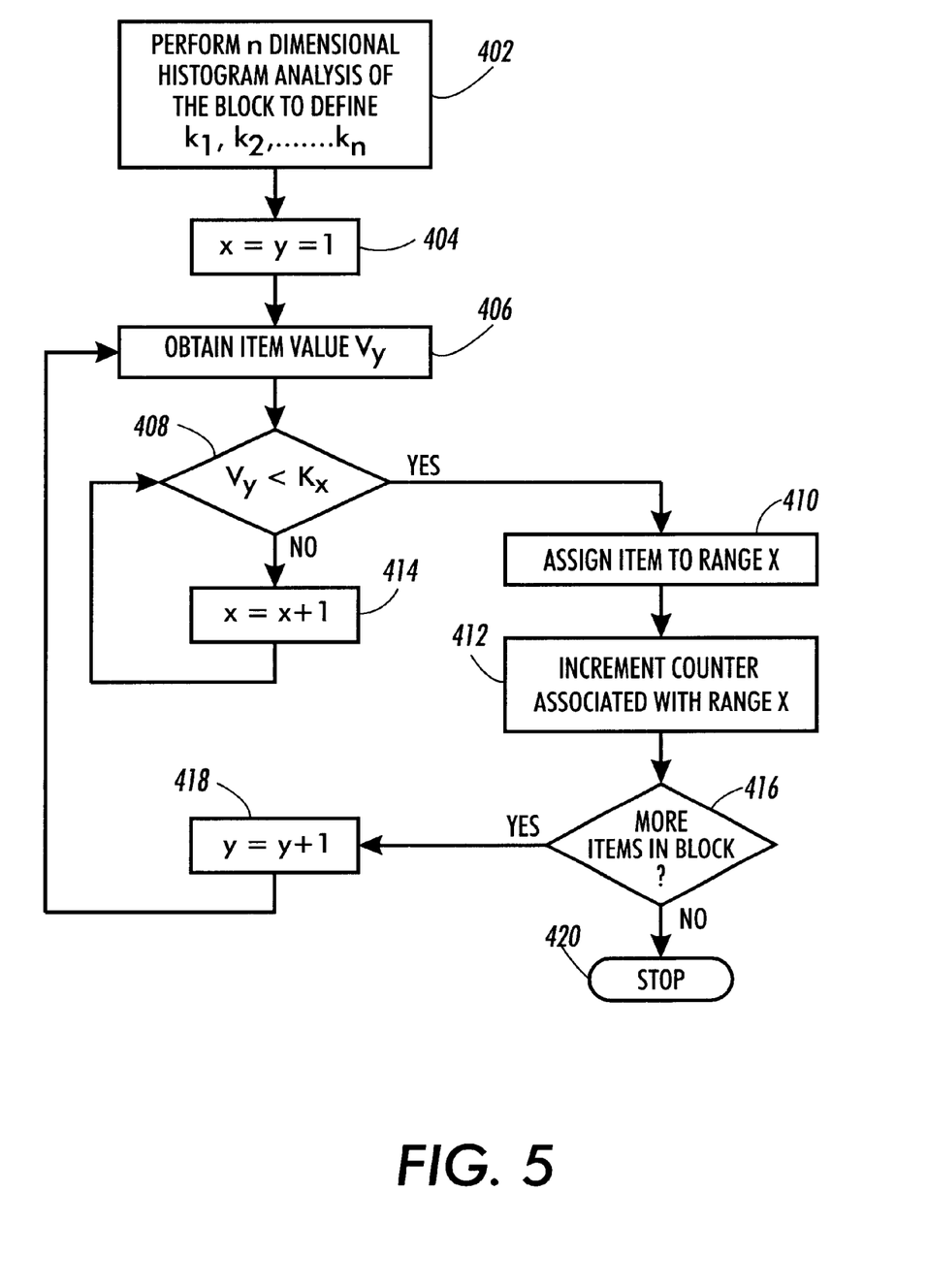
FIG. 5 illustrates a printing system in which the present invention may be used.

Referring now to FIG. 5, the details of another embodiment of the invention which includes finding the largest cluster according to the present invention will now be described. As before, a histogram analysis of the set is performed as indicated in step 402. Counter x, associated with the item location ranges and the items being processed are then initialized as indicated in step 404. The location $v_y$ of item $p_y$ is provided at step 406, and is compared to the upper threshold $k_x$ of the first range as indicated in step 408.

If $v_y$ is less than $k_x$, the item is assigned to range x and the counter associated with that range is incremented as indicated in steps 410 and 412. If $v_y$ is not less than $k_x$, item location range counter x is incremented and $v_y$ is compared to the upper threshold of the next range at step 408. Item location $v_y$ is compared to the upper threshold of each range until the appropriate range is found. Once the item is assigned to a range, the counter associated with it is incremented.

The next step is to see if the last item in the set has been processed, as indicated in step 416. If not, item counter y is incremented and the appropriate range for the next pixel is located using the process described above with reference to steps 406–414. This continues until the last item in the set has been processed. Once that has occurred (step 416) processing for the current set stops as indicated in step 418. The counters associated with all of the ranges are then reviewed to determine which range has the most pixels, and the largest cluster is identified.

This far the invention has been described, for simplicity, using conventional histogram analysis. In the preferred embodiment, a 'A' histogram is used. In a conventional histogram, values are assigned to "bins", with the counter for a bin being incremented each time a value in the range associated with that bin is encountered. Ranges for the bins are non-overlapping, and together the full set of ranges make up the range of values being histogramed. In a fuzzy histogram such as used in this invention, values are assigned to all bins within a certain radius. In one dimension, this means that all bins within a given range centered on the location of the current item would have their counters incremented. Thus if the range is +/−10, and the bin width is 16, a value of 33 would cause the counters for bins 2 and 3 to be incremented, corresponding to ranges 16–31 and 32–47, while a value of 40 would cause the counters for bins 2, 3 and 4, corresponding to ranges 16–31, 32–47, and 48–63, to be incremented.

In two dimensions, conceptually, a circle is drawn about the value, of the specified radius, and every bin that is partially overlapped by the circle would have its counter incremented. In practice, the value to be added to the histogram has finite precision, so each of the coordinates may be separated into a bin number (representing the bin at the center of the circle), and an offset (representing the fractional offset within the center). There will only be a finite (typically small) number of unique offsets that may occur. For example, using 17 bins, for the coordinate x, the bin number is floor[(x+8)/17] (where floor(x) is the greatest integer not greater than x) and the offset is x-17 floor[(x+8)/17]. For 8 bit integers, there are only 15 possible values that the offset can take on in this example. If the number of bins is a power of two, the bin number is given by the high order bits of x+binwidth/2, while the offset is the low order bits of the same expression. Because there is a small set of potential offsets, a list of neighbors may be pre-computed for each offset. In this way it is possible to increment the center bin and all of the affected neighbors (those within a radius r of the input value) without computing any distances at the time the histogram is being built.

In three or more dimensions, the circle generalizes to a sphere or hypersphere, and the use of table lookup for finding the set of neighbors becomes more important.

Figure 6A:
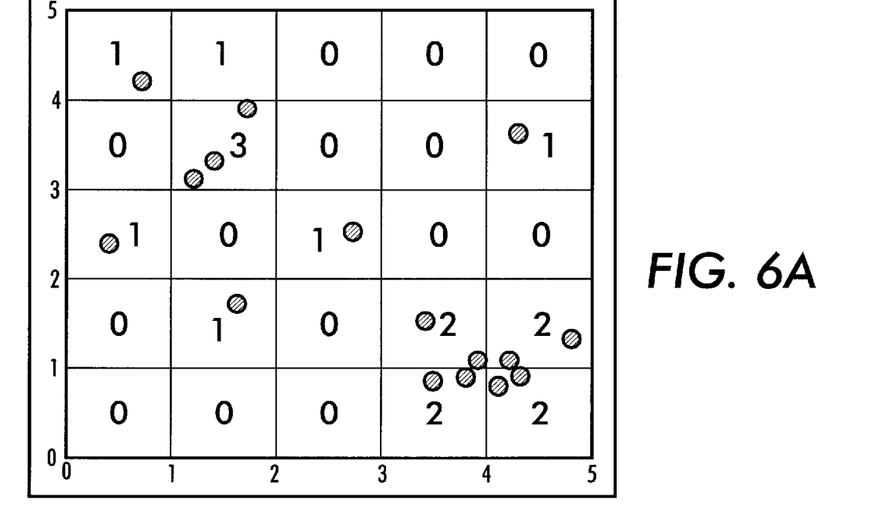
FIGS. 6a and 6b shows an embodiment of the invention implementing a fuzzy histogram.
Figure 6B:
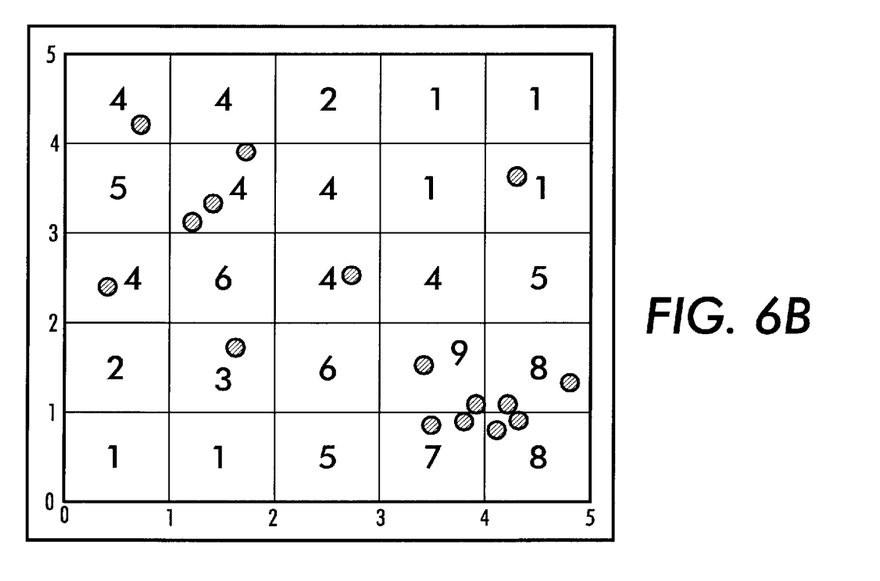

Thus a fuzzy histogram is built by incrementing counters for not only the bin containing each new value, but also all bins within a given radius of the value. The key advantage of this approach may be seen in FIGS. 6A and 6B, wherein a set of (two dimensional) values has been plotted, along with histogram bin boundaries. In FIG. 6A (labeled prior art), the histogram counts show only the values in the respective bins. In FIG. 6B (an embodiment of the present invention), the counts are as computed for a radius of 1 bin width. The largest cluster is identified as being in the lower right of the figure, rather than in the upper left. The present invention attempts to finds the largest cluster rapidly. The center of this largest cluster is used as the representative location for one cluster, and the items in that cluster are removed from the histogram wherever they appear, before the next cluster is found.

Figure 7:
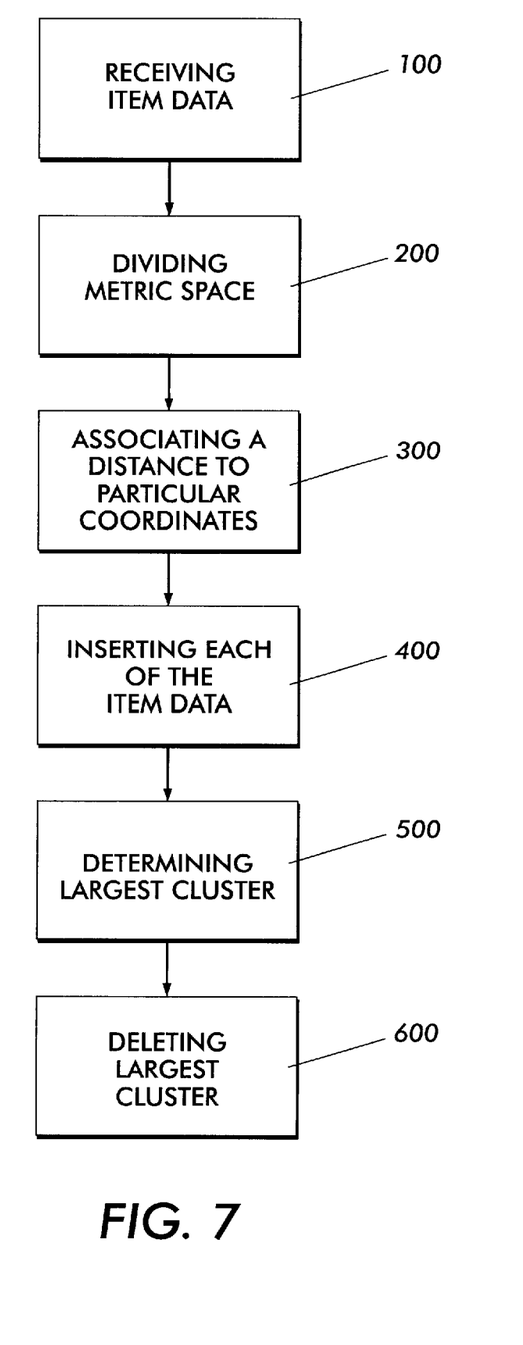
FIG. 7 is a detailed flow chart depicting one embodiment of a portion of this invention that includes finding the largest cluster of items in the present invention.
Figure 8:
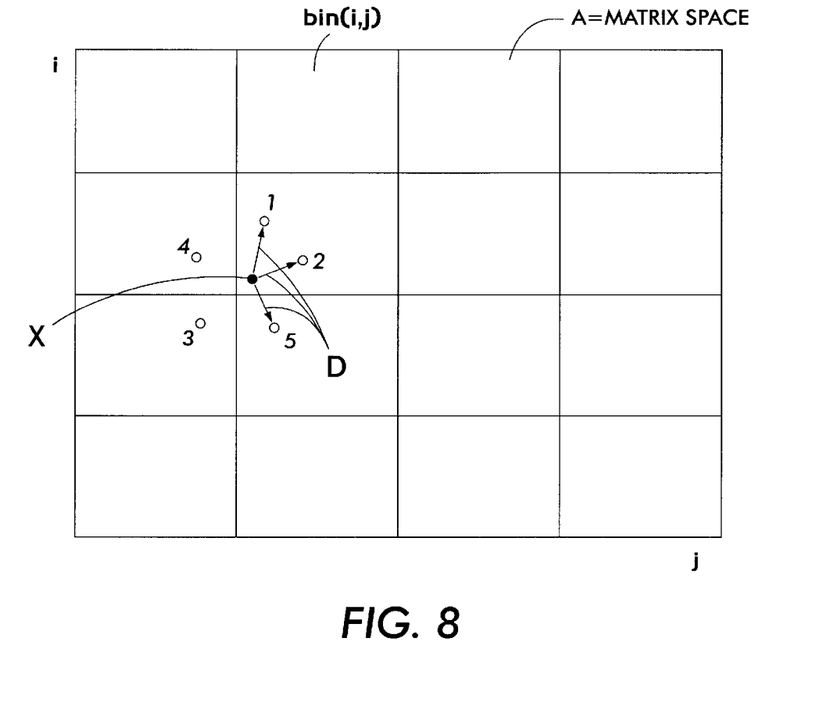
FIG. 8 shows a diagram depicting the invention implementing a fuzzy histogram.

Turning to FIG. 7 shows a detailed flowchart of one embodiment of the present invention which will now be described. Initially data is received (100) which may includes, for example, coordinate data etc. A matrix (a) (see FIG. 8) used to represent a series of bins (i, j). A distance is associated with the particular coordinates. For example, as illustrated in FIG. 8, a distance (D) from a coordinate (X) to each of the items (1, 2, 3, 4, 5) is determined. The distance may be measured using Euclidean measurements and or other metric space measurements. Further, a histogram as illustrated in FIG. 9 is generated.

Figure 9:
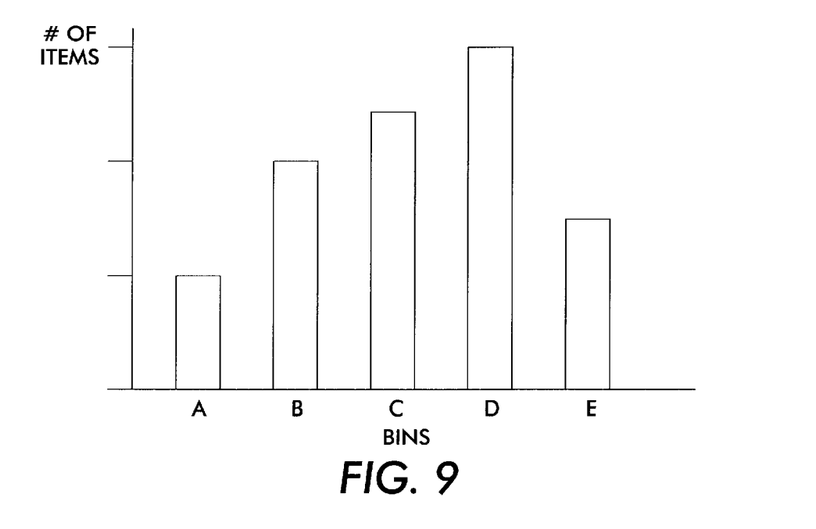
FIG. 9 shows a diagram of a histogram being implemented

Turning to FIG. 9, each of the blocks (A, B. C, D, and E) of the histogram indicates the number of items in a bin (i, j). From this histogram a determination can be made by comparing the item number as to which bin (i, j) contains the most items.

Using the above information of item number, a determination is made as to which cluster has the largest number of items. Subsequently, the largest cluster Step (500) of FIG. 7 is determined and the largest cluster is deleted Step (600) of FIG. 7.

Figure 10:
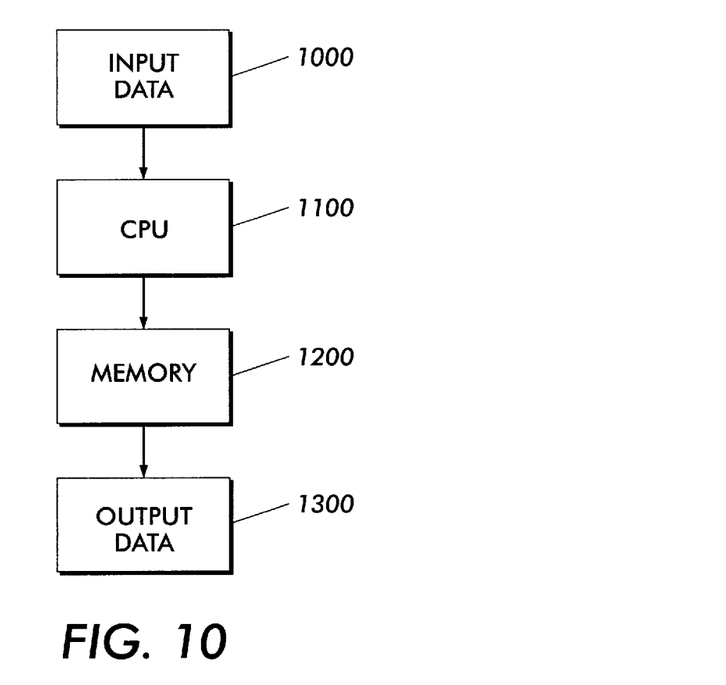
FIG. 10 shows a diagram of an apparatus of an embodiment of the present invention.

Turning to FIG. 10, there is illustrated a schematic of an apparatus utilizing the above-described histogram. For example, input data would be inputted to device (1000) to a CPU (1100) and would be stored in the memory (1200). Subsequently, the data would be output to a data output device (1300).

The speed at which the largest cluster can be found is a critical aspect of the present invention. To summarize, in the preferred embodiment of the invention, the data structure is a histogram indexed by low order bits of location. Each range contains a list of all items that map to it, along with a count of the list size. To avoid quantization errors, each item is entered into each range within a given radius of the item's location. As an item is entered in a list, the count for the associated range is incremented and if it exceeds the largest count so far, that count and the range are recorded. Once all of the items in the set have been entered, the range with the largest count contains the items of the largest cluster.

To obtain the remaining clusters, the process may be iterated in order to find the largest cluster of not yet classified items. First, all items from the largest remaining cluster are removed from the histogram (decrementing appropriate counts and deleting the items from corresponding lists). Then the bin containing the largest count is assumed to be the next largest cluster. Its items are assigned to that cluster and a representative location is found. This process repeats until no items remain.

Figure 11:
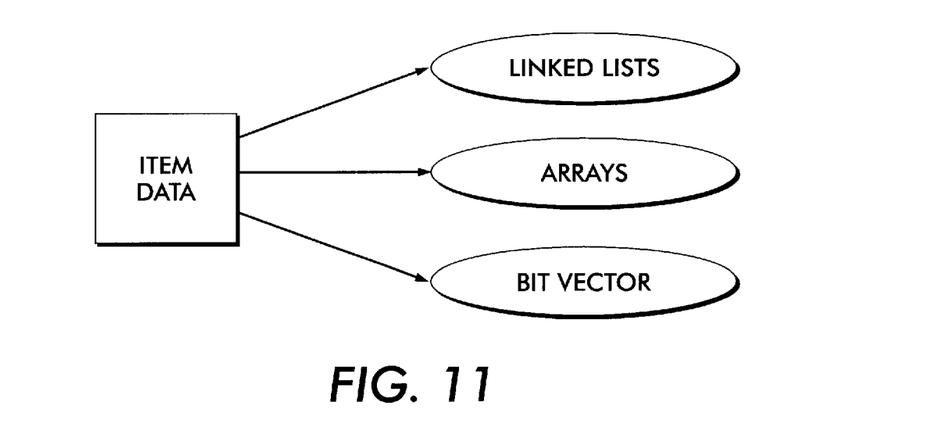
FIG. 11 shows a generalization of the manner of storing item data.

Various data structures as illustrated in FIG. 11 may be used to store the set of items contained in a bin. When the total number of items is relatively small, a bit vector may be used in which the nth bit is set if and only if the nth item is in the set. Another data structure that could be used is a linked list, in which each element is linked to the previous element as it is added. Each of these data structures requires constant time to add an element; the bit vector is particularly compact, and the time to add an element is very little. However the time required to enumerate elements in a bit vector, unless specialized hardware is available, is generally greater than proportional to the number of elements. Thus the preferred data structure will depend on the expected number of items altogether, and the expected number per cluster.

While the invention is described with reference to a particular embodiment, this particular embodiment is intended to be illustrative, not limiting. Various modifications may be made without departing from the spirit and scope of the invention as defined in the amended claims. Modifications and alterations will occur to others upon reading and understanding this specification; therefore, it is intended that all such modifications and alterations are included insofar as they come within the scope of the appended claims or equivalents thereof.

What is claimed is:

1. A method for selecting clusters of a set of data items by using a fuzzy histogram comprising:

receiving item data including coordinates of a metric space;

dividing said metric space into a plurality of bins;

associating a distance from at least a particular coordinate to each of said item data;

inserting a count for each of said item data into a bin and a neighboring bin within said distance of said item data so as to generate a fuzzy histogram, and using said fuzzy histogram to obtain one or more clusters.

2. The method according to claim 1, further comprising:

using said fuzzy histogram to determine the bin having the largest number of items associated therewith.

3. The method according to claim 2, further comprising:

deleting the largest set of items in said bin.

4. The method according to claim 1, wherein:

said metric space is Euclidean space.

5. The method according to claim 1, wherein:

said item data is composed of data structures of linked lists, arrays, or bit vectors.

6. A method for performing cluster analysis using a fuzzy histogram comprising:

determining all bins within a given radius of each item of a set of items;

entering each item into each bin within said given radius;

incrementing a count associated with each said bin and a neighboring bin as said item is entered, and using said fuzzy histogram to store said count.

7. The method according to claim 6, further comprising:

using a fuzzy histogram to determine the bin with a largest count.

8. The method according to claim 7, further comprising:

using a fuzzy histogram to delete the items in the bin with the largest count.

9. The method according to claim 6, wherein:

said radius is defined in a metric space.

10. The method according to claim 6, wherein:

said bin is a data structure of a linked list, array or bit vector.

* * * * *